(12) United States Patent
Sugai (10) Patent No.: US 10,922,928 B2
(45) Date of Patent: Feb. 16, 2021

(54) LOTTERY DEVICE AND LOTTERY METHOD

(71) Applicant: SEGA SAMMY CREATION INC., Yokohama (JP)

(72) Inventor: Taiji Sugai, Tokyo (JP)

(73) Assignee: SEGA SAMMY CREATION INC., Yokohama (JP)

( * ) Notice: Subject to any disclaimer, the term of this patent is extended or adjusted under 35 U.S.C. 154(b) by 0 days.

(21) Appl. No.: 16/310,091

(22) PCT Filed: Jul. 8, 2016

(86) PCT No.: PCT/JP2016/070341
§ 371 (c)(1),
(2) Date: Dec. 14, 2018

(87) PCT Pub. No.: WO2018/008156
PCT Pub. Date: Jan. 11, 2018

(65) Prior Publication Data
US 2019/0206181 A1    Jul. 4, 2019

(51) Int. Cl.
*G07F 17/32* (2006.01)
*A63F 13/57* (2014.01)
*A63F 13/52* (2014.01)
*A63F 13/80* (2014.01)
*A63F 13/70* (2014.01)
(Continued)

(52) U.S. Cl.
CPC ............ *G07F 17/329* (2013.01); *A63F 13/52* (2014.09); *A63F 13/57* (2014.09); *A63F 13/70* (2014.09); *A63F 13/80* (2014.09); *G06T 13/20* (2013.01); *G07F 17/3213* (2013.01); *G07F 17/34* (2013.01)

(58) Field of Classification Search
None
See application file for complete search history.

(56) References Cited

U.S. PATENT DOCUMENTS 8,900,047 B1 *  12/2014  Ferrell ...................... A63F 9/04
                                                                 273/274
2009/0181746 A1 *  7/2009  Nagano .................... G07F 17/32
                                                                 463/17

(Continued)

FOREIGN PATENT DOCUMENTS

JP      2007-097965 A     4/2007
JP      2009-066321 A     4/2009

(Continued)

*Primary Examiner* — Jay Trent Liddle
*Assistant Examiner* — Alex F. R P. Rada, II
(74) *Attorney, Agent, or Firm* — Faegre Drinker Biddle & Reath LLP (57) ABSTRACT

A lottery device comprises a control unit and a storage unit. The control unit implements a lottery function by executing a program stored in the storage unit. The lottery function comprises an associating function for associating, on the basis of random data, a plurality of positions on a virtual object and a plurality of marks, an operation control function for simulating a motion of the virtual object in a virtual space by physical operation, and a determining function for determining a lottery result on the basis of a mark associated with a position on the virtual object as determined according to a state of the virtual object in the simulation result.

9 Claims, 7 Drawing Sheets

(51) Int. Cl.
*G06T 13/20* (2011.01)
*G07F 17/34* (2006.01)

(56) References Cited

U.S. PATENT DOCUMENTS

| | | | |
|---|---|---|---|
| 2009/0181748 A1* | 7/2009 | Nagano | G07F 17/32 |
| | | | 463/17 |
| 2010/0056257 A1* | 3/2010 | Kido | G07F 17/32 |
| | | | 463/22 |
| 2010/0069142 A1* | 3/2010 | Kido | G07F 17/32 |
| | | | 463/22 |
| 2010/0222131 A1 | 9/2010 | Goto et al. | |
| 2012/0172103 A1* | 7/2012 | Gurule | G07F 17/3258 |
| | | | 463/17 |
| 2012/0196664 A1 | 8/2012 | Grant et al. | |
| 2016/0012671 A1* | 1/2016 | Alsip | G07F 17/3267 |
| | | | 463/22 |
| 2016/0292954 A1* | 10/2016 | Sugai | G07F 17/323 |

FOREIGN PATENT DOCUMENTS

| | | |
|---|---|---|
| JP | 2014-028267 A | 2/2014 |
| JP | 2014-087479 A | 5/2014 |
| JP | 2014-166257 A | 9/2014 |

\* cited by examiner

LOTTERY DEVICE AND LOTTERY METHOD

CROSS-REFERENCE TO RELATED APPLICATIONS

This application is the U.S. national phase of the International Patent Application No. PCT/JP2016/070341 filed Jul. 8, 2016, the entire content of which is incorporated herein by reference.

TECHNICAL FIELD

The present disclosure relates to a lottery device and a lottery method.

BACKGROUND

A technique for carrying out lottery drawing using random numbers on a computer has been known. For example, Japanese Patent Publication JP 2009-066321 A discloses a technique for obtaining data generated by a random number generating circuit and outputting, as a lottery result, a design on a face of a die previously associated with the data.

SUMMARY

As lottery drawing carried out on a computer, when the motion of a virtual object in a virtual space is simulated by physical operation, and a lottery result is determined according to the simulation result, the lottery drawing may be carried out in a more true-to-life atmosphere.

When the simulation is carried out by the physical operation to determine a lottery result, the lottery result intended to be uniform may be biased depending on the design of the virtual object.

When a program or device which can carry out lottery drawing is produced, the national legal system may demand that multiple events in each lottery result are generated with equal probabilities. In order to prove that each event occurs with an intended probability, it would be necessary to actually carry out lottery drawing an enormous number of times in testing. The testing could become a large burden during manufacturing.

With the foregoing in view, it is an object of the present disclosure to provide a lottery technique which can make it easier to prove that multiple events in a virtual space occur with an intended probability.

A lottery device according to one embodiment comprises a control unit and a storage unit, the control unit is configured to execute a program stored in the storage unit to thereby implement: an associating function for associating, on the basis of random data, a plurality of positions in a virtual object in which a lottery result is to be indicated and a plurality of kinds of marks to be indicated in the plurality of positions; an operation control function for simulating a motion of the virtual object in a virtual space by physical operation; and a determining function for determining a lottery result on the basis of the mark associated with a particular position on the virtual object as determined according to a state of the virtual object in the simulation result.

A lottery method according to an embodiment is carried out in a device comprising a control unit, and a storage unit, the method being carried out by the control unit executing a program stored in the storage unit, the method comprising: an associating step of associating, on the basis of random data, a plurality of positions in which a lottery result is to be indicated and a plurality of kinds of marks to be indicated in the plurality of positions; an operation controlling step of simulating a motion of the virtual object in a virtual space by physical operation; and a determining step of determining a lottery result on the basis of the mark associated with a particular position on the virtual object as determined according to a state of the virtual object in the simulation result.

According to an embodiment, a lottery technique which can make it easier to prove that multiple events in a virtual space occur with an intended probability is provided.

BRIEF DESCRIPTION OF DRAWINGS

Various embodiments are illustrated in the drawings, in which.

DETAILED DESCRIPTION

Now, an embodiment will be described in conjunction with the accompanying drawings. Note however that the following embodiment will be described simply by way of illustration and is not intended to exclude various modifications and application of techniques which are not explicitly disclosed herein. More specifically, embodiments may be carried out in various modified forms (such as a combination of embodiments). In the drawings, the same or similar portions are designated by the same or similar reference characters. The drawings are schematic and do not necessarily represent actual dimensions, dimensional ratios, etc. Some components are shown to have different dimensional relations or ratios among drawings.

Now, a lottery device and a lottery method according to an embodiment will be described in conjunction with the drawings. Here, in the following description of the embodiment, the lottery device is provided in a game machine. However, the lottery device according to the embodiment may be provided in any other apparatus or operated independently.

Exemplary Hardware Configuration of Game Machine

Figure 1:
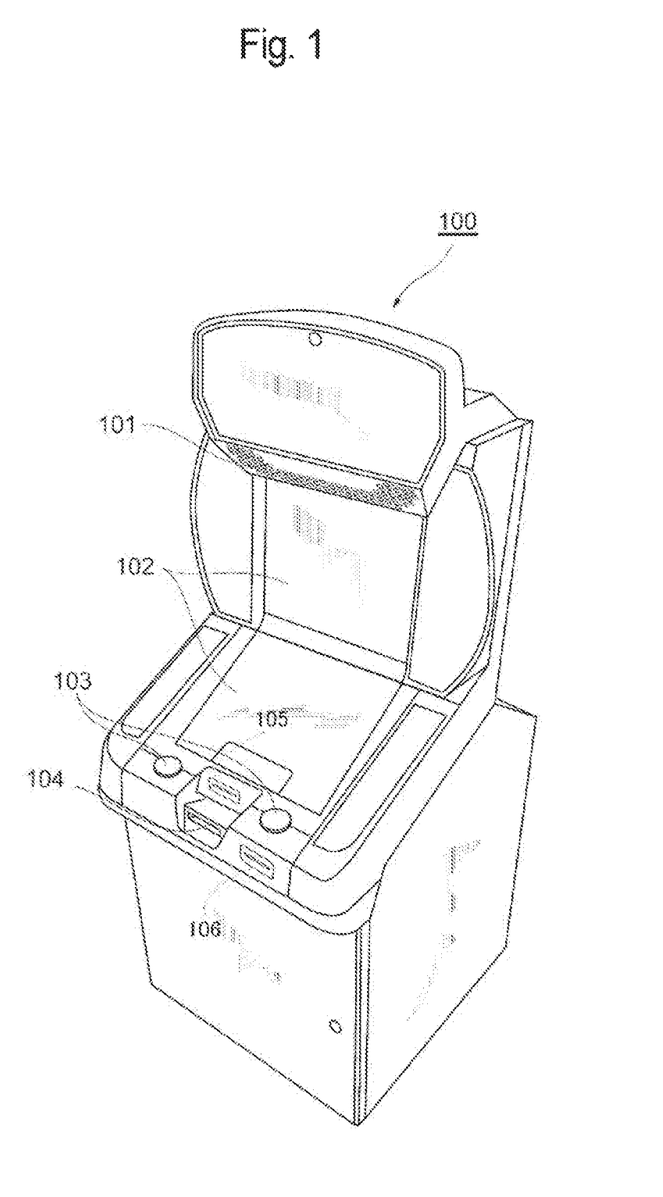
FIG. 1 is a perspective view of the appearance of a game machine according to one embodiment.

FIG. 1 is a perspective view showing the appearance of a game machine according to the embodiment. The game machine 100 shown in FIG. 1 is provided for example in a casino or an amusement facility. According to the embodiment, using the game machine 100, a player can play a dice game, a roulette game, or any other game in which lottery drawing is carried out during the game.

As shown in FIG. 1, the game machine 100 comprises, in appearance, a speaker 101, a plurality of display devices 102, an operation input device 103, a card reader 104, a bill insertion device 105, and a ticket dispenser 106. The speaker 101 is audio output means for outputting audio guidance, sound effects, etc. for a game. The display device 102 is display means for displaying images (such as a still picture, a motion picture, and a video) used for expressing or producing a game. The operation input device 103 comprises a plurality of operation buttons and is used to input an instruction from a player to the game machine through the operation buttons. Note that the operation input device 103 may have any configuration other the above such as a touch panel and an operation stick which allows the player to input an instruction. The card reader 104 is a card reader which reads information from a card owned by the player. The bill insertion device 105 is a device which reads an inserted bill or ticket. The ticket dispenser 106 is ticket output means for dispensing a card to the player.

The card read by the card reader 104 is a medium having play information on the player stored thereon. The card may be additionally stored with acquired points depending on the playing circumstance of the player. The player can receive various services according to the information stored on the card, while the content stored on the card does not affect the result of playing.

The game machine 100 comprises a computing device therein as a control device for controlling the game machine 100 on the whole.

Figure 2:
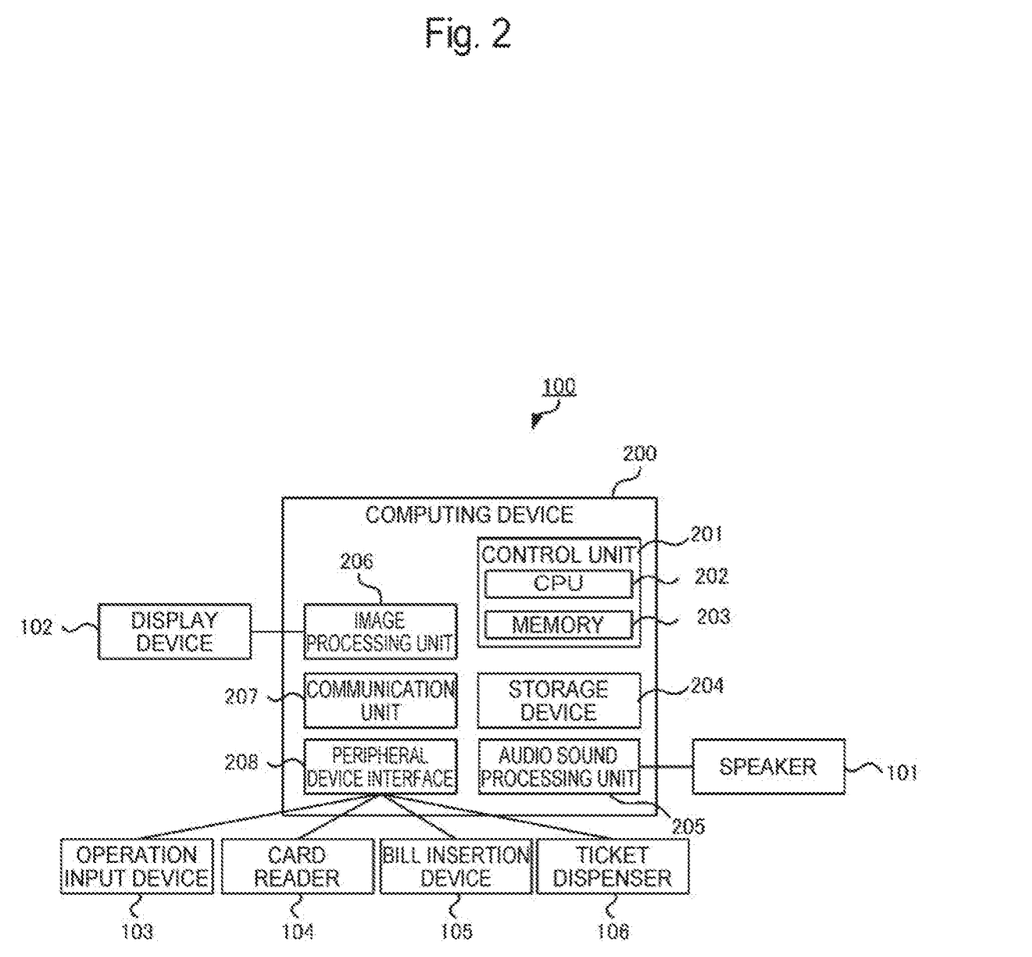
FIG. 2 is a block diagram showing a main hardware configuration of the game machine according to the embodiment.

Referring to FIG. 2, an example of the hardware configuration of the computing device 200 included in the game machine 100 will be described. As shown in FIG. 2, the computing device 200 comprises, as a main hardware configuration, a control unit 201, a storage device 204, an audio sound processing unit 205, an image processing unit 206, a communication unit 207, and a peripheral device interface 208.

The control unit 201 comprises a CPU (Central Processing Unit) 202 and a memory 203. The computing device 200 controls the processing and operation of the other hardware components and functions as various kinds of function implementing means for example as the CPU 202 executes prescribed software programs (such as a lottery program and a game software program) stored for example in the memory 203 and the storage device 204. More specifically, the computing device 200 executes prescribed programs under the control of the control unit 201 to implement a game function in cooperation with other hardware. Note that FIG. 2 simply shows essential components provided in the computing device 200, and the computing device 200 further comprises other components generally provided in an information processing device.

The storage device 204 may include a hard disk. Data is read out/written from/to the storage device 204 by the control unit 201. More specifically, data such as software programs necessary for processing in the computing device 200 is written to the storage device 204, and data resulting from the processing is also written thereto. The audio sound processing unit 205 carries out various kinds of sound processing under the control of the control unit 201. The image processing unit 206 carries out various kinds of graphic processing under the control of the control unit 201. The communication unit 207 is an interface which enables communication with a sever and other game machines. The peripheral device interface 208 is an interface which allows the computing device 200 to communicate with any of peripheral devices such as the operation input device 103, the card reader 104, the bill insertion device 105, and the ticket dispenser 106.

Exemplary Functional Configuration of Game Machine

Now, an exemplary functional configuration of the game machine 100 according to the embodiment will be described.

Figure 3:
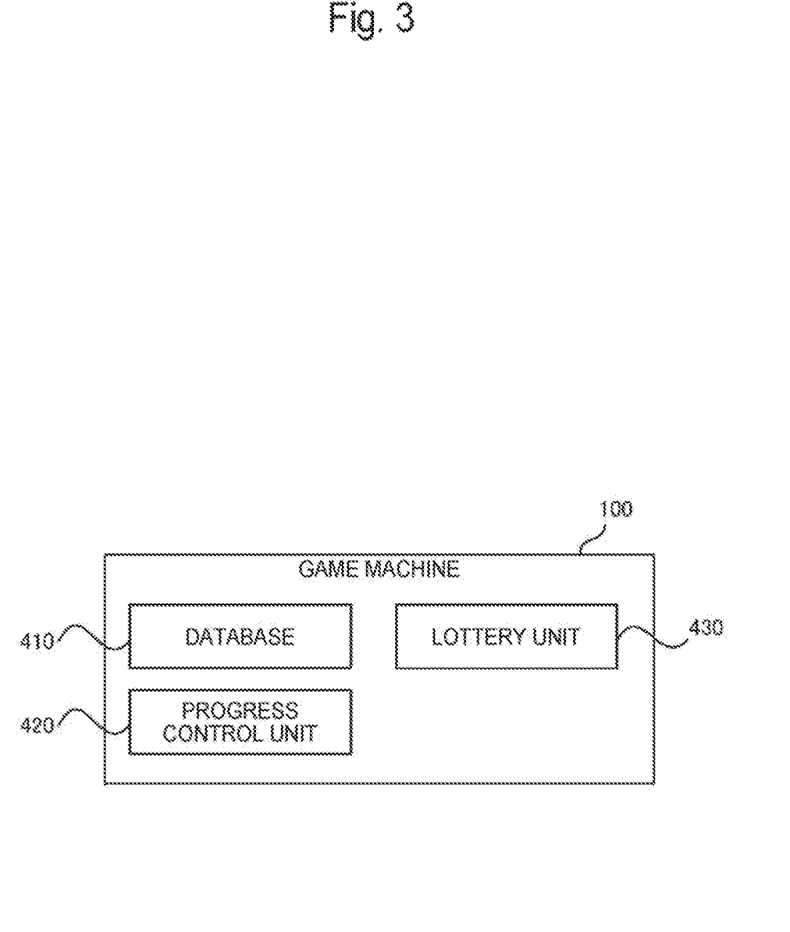
FIG. 3 is a block diagram showing a main functional configuration of the game machine according to the embodiment.

FIG. 3 is a block diagram showing the functional configuration of the game machine 100 according to the embodiment. As shown, the game machine 100 comprises, as a main functional configuration, a database 410, a progress control unit 420, and a lottery unit 430. These functional components are implemented for example as the control unit 201 loads a game software program stored in a storage such as the storage device 204 into the memory 203 and executes the program, so that the program (software) provided in the game machine 100 cooperates with the hardware. Note that the game machine 100 has functions provided in a general game machine other than those shown in FIG. 3, which will not be described here.

The database 410 stores various kinds of information such as information necessary for processing executed in the game machine 100 and information produced by the processing. The database 410 stores for example a control software program for controlling the progress of a game, images (such as a still picture, a motion pictures, and a video) and sound data used for expressing or producing the game, and data (comprising parameters) related to the state of the game in progress.

The progress control unit 420 is configured to execute processing for controlling the progress of a game according to operation by the player of the game to the game machine 100 and the control software program stored in the database 410. In particular, the progress control unit 420 controls the progress of a game which carries out lottery drawing in the game such as a game using dice or a roulette game.

The lottery unit 430 is configured to execute lottery processing. The motion of a virtual object in a virtual space is simulated on the basis of physical operation and the lottery processing is executed according to the simulation result. The game machine 100 having the lottery unit 430 also functions as a lottery device.

The lottery processing carried out by the lottery unit 430 may include lottery processing using dice or roulette. In the lottery processing using dice, the lottery unit 430 carries out such control that the motion of virtual dice being thrown is simulated by physical operation, and the motion of the dice according to the simulation is displayed at the display device 102. The lottery unit 430 determines the number of dots on the upper surfaces of the stopped dices as a result of lottery according to the simulation.

The lottery processing using roulette, the lottery unit 430 simulates the motions of the wheel for virtual roulette and a virtual ball when the wheel is spun and the ball is thrown and carries out such control that the video of the motions of the wheel and the ball according to the simulation is displayed at the display device 102. As a result of simulation, the lottery unit 430 determines a number associated with a spot in which the ball is entered among a plurality of spots provided on the wheel.

The lottery processing by the lottery unit 430 is carried out according to the progress of the game by the progress control unit 420 and the lottery result by the lottery unit 430 can be used for processing control for the progress of the game by the progress control unit 420.

Figure 4:
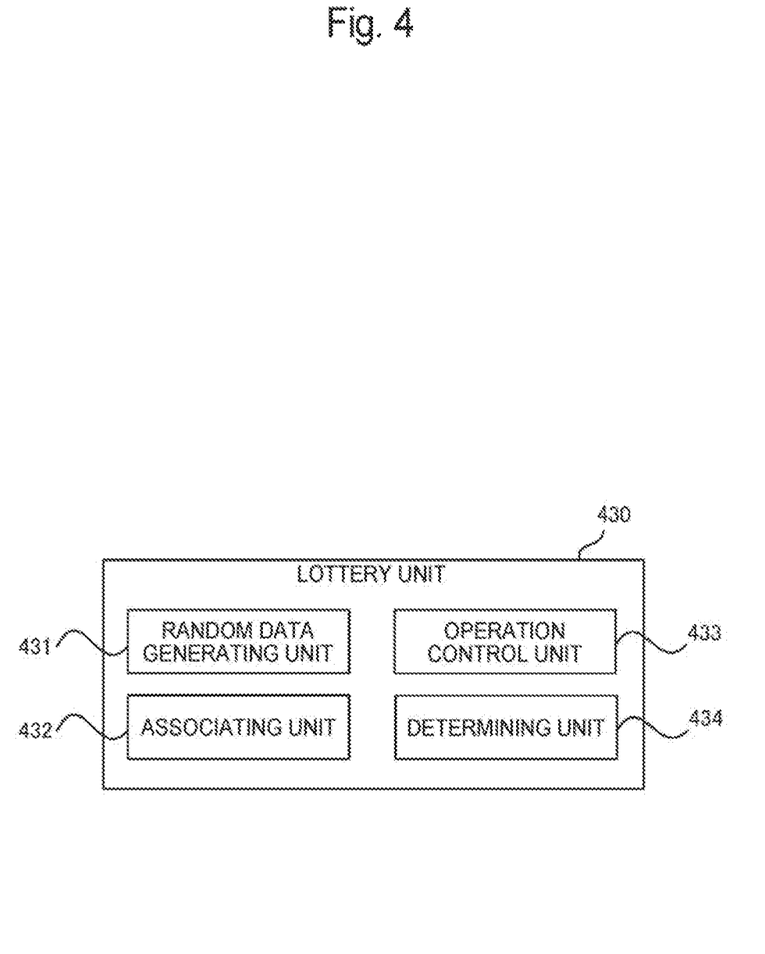
FIG. 4 is a block diagram showing the configuration of a lottery unit according to the embodiment.

Referring to FIG. 4, the detailed functional configuration of the lottery unit 430 and the detailed processing by the lottery unit 430 will be described. The lottery unit 430 comprises a random data generating unit 431, an associating unit 432, an operation control unit 433, and a determining unit 434.

The random data generating unit 431 is configured to generate and output random data. According to the embodiment, it is logically and experimentally ensured that each piece of random data output by the random data generating unit 431 is randomly output (or all kinds of data that can be output are output with the same probability). The random data generating unit 431 may include a random number generator.

The associating unit 432 functions to obtain data on a virtual object from the database 410 and associates a plurality of positions in the virtual object in which a lottery result is to be indicated and a plurality of kinds of marks to be indicated in the plurality of positions on the basis of the random data output from the random data generating unit 431. The data on the virtual object is image (video) data to be displayed at the display device 102 so that lottery drawing can be carried out and may include data on a die-shaped polyhedron or data on wheel shaped portion for roulette.

Figure 5:
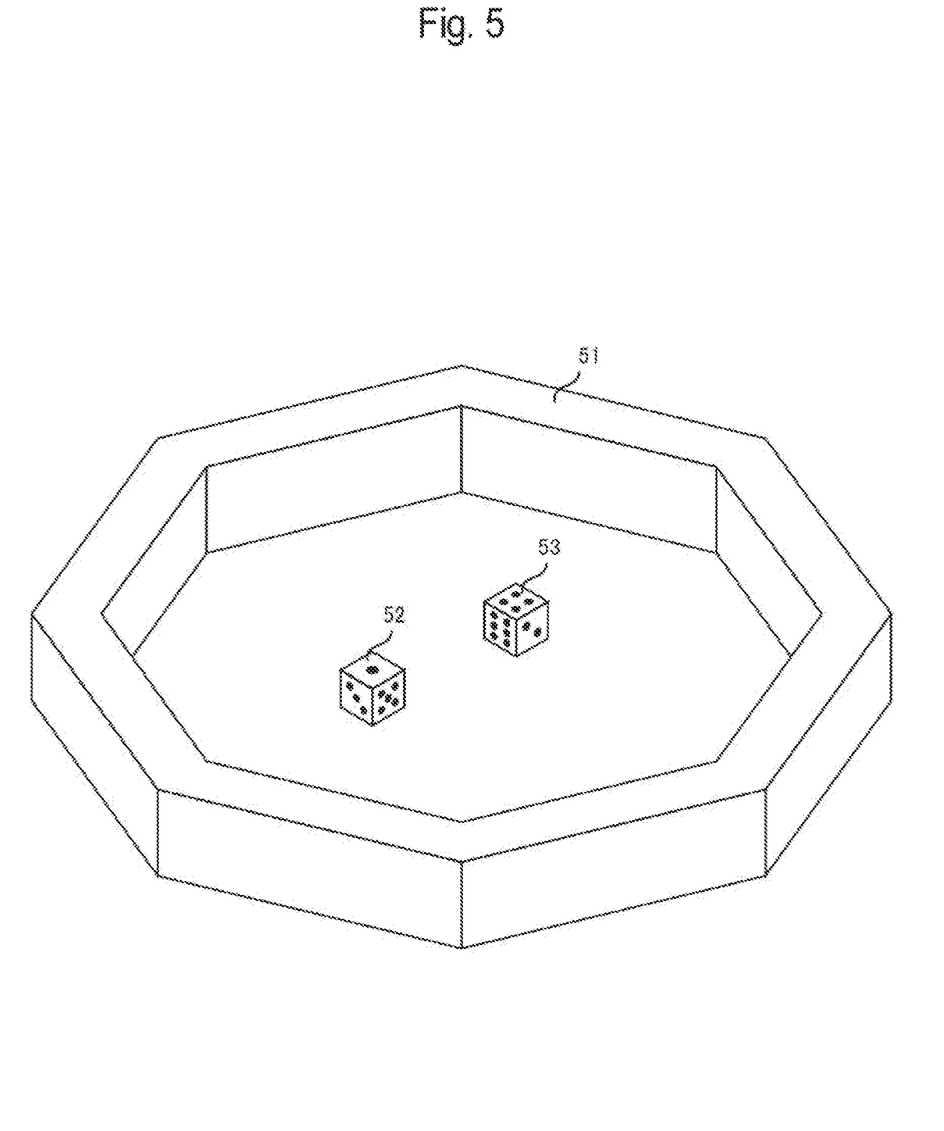
FIG. 5 is a view showing an example of a video displayed at a display unit according to the embodiment.

Referring to FIG. 5, an example of the processing carried out by the associating unit 432 when the virtual objects are dice will be described. FIG. 5 shows an exemplary image of virtual objects displayed at the display device 102 on the basis of data obtained from the database 410. In this example, a dice tray 51 and dice 52 and 53 placed in the dice tray 51 are shown as a virtual object image. Note that the dice 52 and 53 have a hexahedron shape but may be in any other polyhedron shape.

One or more dots (marks) each representing any of numbers 1 to 6 are indicated on the surfaces of the dice 52 and 53 as the virtual objects in association with the surfaces. More specifically, a texture representing one or more dots is mapped on each surface of the die shaped virtual objects. The associating unit 432 determines which kind of dots (which mark among the plurality of kinds of marks) is to be displayed in association with each surface (position) among a plurality of surfaces (a plurality of positions in which a lottery result is to be indicated) of the dice 52 and 53 on the basis of the random data output from the random data generating unit 431. The association between the surfaces of the virtual dices and the marks representing 1 to 6 is determined by the associating unit 432 according to a prescribed rule. For example, according to the rule, the association may be such that the total value of a number indicated on a certain surface of a die and a number indicated on the back surface thereof may be 7. In this case, among the six surfaces of the die, marks (numbers) to be associated with some of the surfaces are determined on the basis of random data, and the marks to be associated with the other surfaces may be determined according to the rule.

The associating timing by the associating unit 432 may be set arbitrarily. For example, as will be described, the marks may be displayed in association with each of the surfaces of the dice 52 and 53 in the relation associated by the associating unit 432 immediately before casting of the dice 52 and 53 (or the moment the dice is cast). (More specifically, display may be made according to new association between the surfaces and the marks determined or changed by the associating unit 432 from the initial association between the surfaces and the marks). Alternatively, the association may be determined by the associating unit 432 immediately before the images of the dice 52 and 53 are displayed at the display device 102 for the first time, and the marks may be displayed on the surfaces of the dice 52 and 53 according to the determined association.

Figure 6:
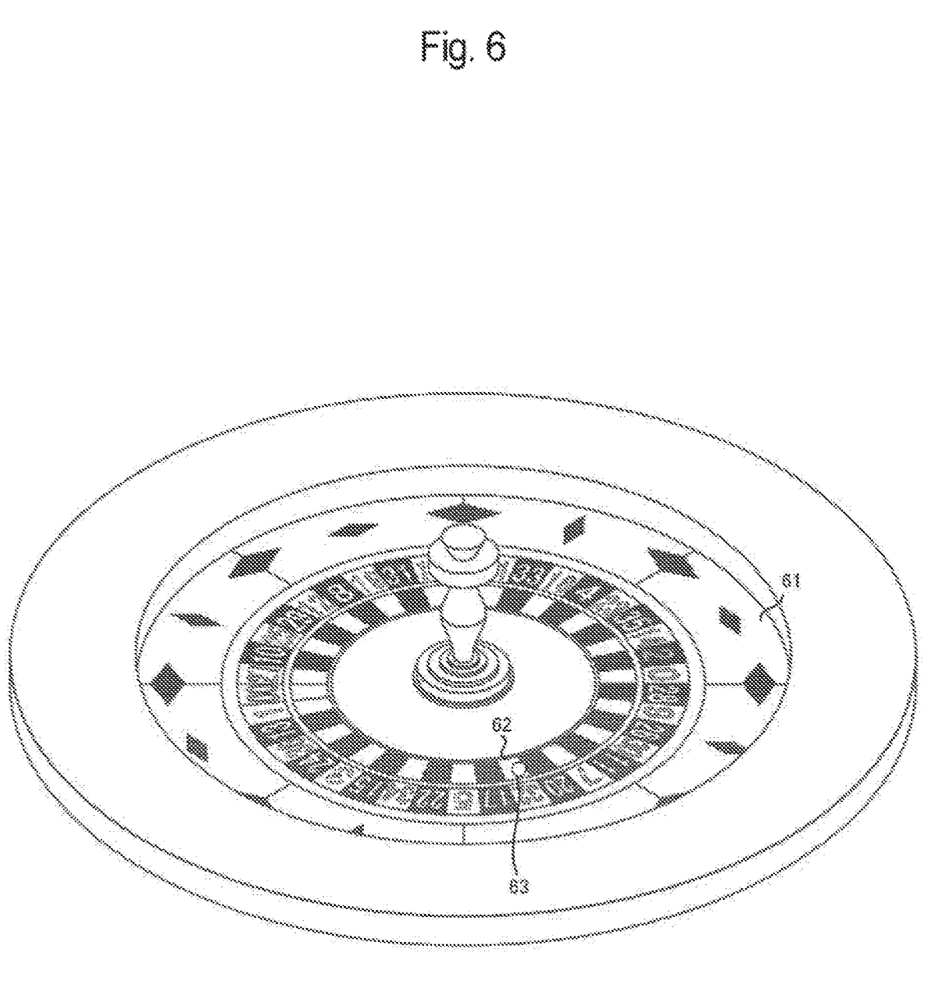
FIG. 6 is a view showing an example of a video displayed at the display unit according to the embodiment.

Referring to FIG. 6, exemplary processing carried out by the associating unit 432 when the virtual object is a wheel for roulette will be described. FIG. 6 shows an image of the virtual object displayed at the display device 102 on the basis of data obtained from the database 410. In this example, the wheel 61 for roulette and a ball 63 entered in a spot 62 provided on the wheel 61 are shown as the images of the virtual objects. The spot 62 has a shape to store the cast ball 63. There are 38 spots provided on the wheel 61. The number of the spots provided on the wheel 61 is not limited to the above and may be an arbitrary number. The shape of the wheel 61 may be any wheel shape which allows roulette to be played.

Any of the marks representing 0 to 36 and 00 is indicated on the wheel 61 in association with each of the spots on the wheel 61. For example, a mark representing the number "32" is indicated at the spot 62 in association with the spot 62. (More specifically, the mark representing "32" is indicated in the position next to the spot 62.) The associating unit 432 determines, on the basis of random data output from the random data generating unit 431, which mark is to be displayed in association with each of the plurality of spots (the plurality of positions in which a lottery result is to be indicated) set on the wheel 61. For example, random data and sets of marks (numbers) to be displayed at the spots on the wheel 61 are previously associated with each other, and the associating unit 432 can determine which mark to be displayed in association with each of the spots (positions) (or displayed in the vicinity of each of the spots) on the wheel 61 on the basis of the random data output from the random data generating unit 431. More specifically, the associating unit 432 associates each of the spots (positions) on the wheel 61 as the virtual object and any of the plurality of marks on the basis of the random data.

The association timing may arbitrarily be set. For example, any of the plurality of marks may be displayed in association with each of the spots on the wheel 61 in the relation associated by the associating unit 432 immediately before the wheel 61 spins (the moment the wheel spins) as will be described. (More specifically, display may be made according to new association between the spots and the marks determined or changed by the associating unit 432 from the initial association between the spots and the marks.)

The operation control unit 433 shown in FIG. 4 simulates the motion of the virtual object in the virtual space by physical operation in response to a prescribed input. The prescribed input is for example an operation input by the user.

Referring to FIG. 5, an example of processing carried out by the operation control unit 433 when the virtual object is a die-shaped polyhedron will be described. For example, the user can input a direction and a speed for casting (rolling) the dice 52 and 53 shown in FIG. 5 by an operation input by swiping the screen displayed at the display device 102. The operation control unit 433 simulates the motion of the cast dice 52 and 53 by physical operation at least in response to the input. The physical operation is carried out in consideration of coefficients such as a coefficient of restitution when the dice 52 and 53 impinge upon the inner wall and the bottom of the dice tray 51 and the friction coefficients of the inner wall and the bottom of the dice tray 51. As a result of the simulation, the motion of the dice 52 and 53 stops while the dice 52 and 53 have any of the surfaces faced upright.

Referring to FIG. 6, an example of processing carried out by the operation control unit 433 when the virtual object is a wheel shaped portion for roulette will be described. The user can input operation for example by swiping the screen displayed at the display device 102 to spin the wheel 61 shown in FIG. 6 and input a direction and a speed for casting the ball 63. The operation control unit 433 simulates the motion of the wheel 61 and the ball 63 moving on the wheel 61 and coming into any of the spots by physical operation at least in response to the input. The physical operation is executed for example in consideration of resistance received by the wheel 61 during spinning or the coefficient of restitution and the coefficient of friction of the ball 63. As a result of the simulation, the motion of wheel 61 and the ball 63 stops while the ball 63 is in any of the spots provided on the wheel 61. FIG. 6 shows the state in which the wheel 61 stops while the ball 63 is in the spot 62.

The determining unit 434 determines a lottery result on the basis of a mark associated with a position on the virtual object as determined according to the state of the virtual object in the result of simulation by the operation control unit 433. An example of a method for determining a lottery result is as follows.

When the virtual objects are dice, the determining unit 434 determines, as a lottery result, a number represented by dot(s) (mark) displayed on each of the upper surface positions of the dice after the motion is stopped as a result of simulation by the operation control unit 433. For example, in the example shown in FIG. 5, the dice 52 and 53 are stationary while the dots on their upper surfaces represent 1 and 4, and therefore the determining unit 434 determines these numbers as a lottery result. More specifically, the determining unit 434 determines the lottery result on the basis of the marks associated with the positions of the upper surfaces of the dice determined according to the states after the dice stop moving in the simulation result.

When the virtual object is a wheel for roulette, the determining unit 434 determines, as a lottery result, a mark associated with a spot having a ball therein among the plurality of spots provided on the wheel as a result of simulation of the spinning motion of the wheel by the operation control unit 433. For example, in the example shown in FIG. 6, the wheel 61 for roulette has the ball 63 in the spot 62, and therefore the determining unit 434 determines, as a lottery result, the mark "32" associated with the position of the spot 62 on the wheel 61. More specifically, the determining unit 434 determines the lottery result on the basis of the mark associated with the position of the spot when the ball rests in the spot on the wheel in the result of simulation.

As in the foregoing, according to the embodiment, the associating unit 432 associates the plurality of positions on the virtual object and the plurality of marks on the basis of random data. Thereafter, the operation control unit 433 simulates the motion of the virtual object in the virtual space by physical operation. The determining unit 434 determines a lottery result on the basis of a mark associated with a position on the virtual object as determined according to the state of the virtual object in the result of simulation by the operation control unit 433.

More specifically, the lottery result is not determined simply on the basis of the result of simulation of the motion of the virtual object but on the basis of association based on random data between the plurality of positions on the virtual object and the plurality of marks. If the lottery result is determined only according to the simulation result of the motion of the virtual object, the lottery result could be biased for example depending on the shape of the virtual object or some conditions. In contrast, according to the embodiment, the lottery result is determined according to the association based on random data between the plurality of positions on the virtual object and the plurality of marks, and therefore randomness can be secured in the lottery result. More specifically, in the above example, it is guaranteed that the dice 52 and 53 roll each of 1 to 6 with a probability of 1/6. In the roulette lottery, it is guaranteed that the 38 marks indicated at the wheel 61 are each obtained as a lottery result with a probably of 1/38.

Therefore, according to the embodiment, when a program or device which allows lottery drawing to be carried out is produced, testing comprising an enormous number of actual lottery drawings is not necessary in order to prove that each lottery result occurs with an intended probability such as an equal probability. Occurrence of the lottery result with an intended probability (occurrence of all the lottery results with the same probability in the above example) can be proved more easily by demonstrating that the lottery result is determined according to the association based on random data between the plurality of positions on the virtual object and the plurality of marks.

Processing Flow

Figure 7:
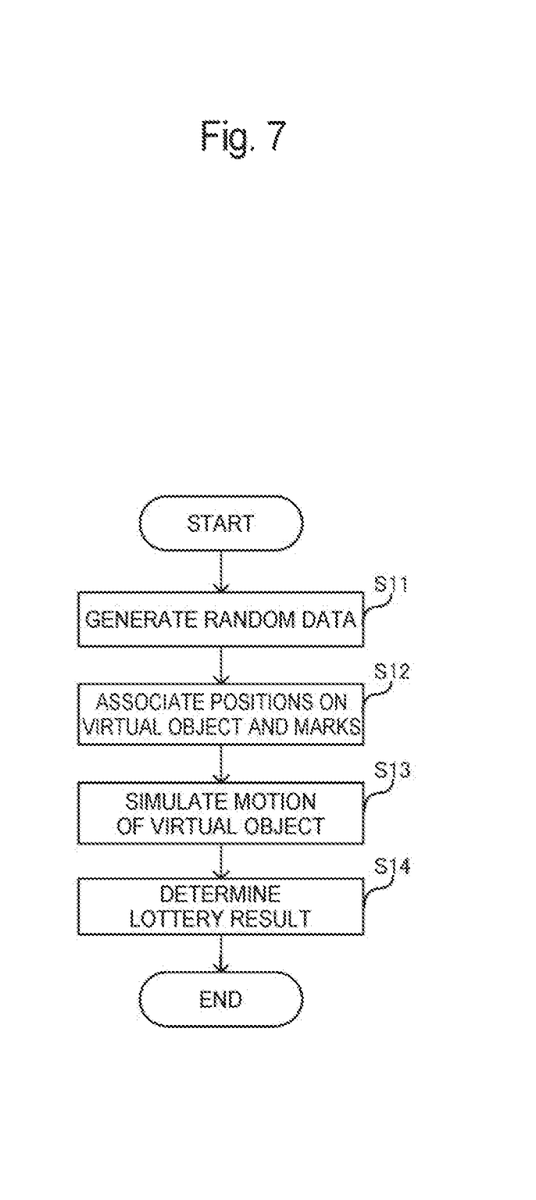
FIG. 7 is a flowchart for illustrating processing carried out by the game machine according to the embodiment.

Now, referring to FIG. 7, the flow of lottery processing carried out in the game machine 100 will be described. The processing is executed for example as a game software program stored for example in the storage device 204 is loaded into the memory 203 and executed by the control unit 201, so that the program (software) provided in the game machine 100 cooperates with the hardware.

Note that the processing steps included in the following processing flow can have the sequence changed or can be carried out in parallel within the range which does not cause any discrepancy with respect to the processing content. An additional step may be provided between the processing steps within the range which does not cause any discrepancy with respect to the processing content. The step described as a single step for ease of description may be divided into multiple steps and executed, while the processing described as multiple steps for ease of description may be understood as a single step. Note that each processing step has been described above in detail and will not be repeated here.

In step S11, the control unit 201 generates and outputs random data. According to the embodiment, it has been logically and experimentally ensured that each piece of random data output in the step is randomly output (or all kinds of data that can be output are output with the same probability).

Then, in step S12, the control unit 201 associates, on the basis of the random data output in step S11, a plurality of positions in a virtual object read out from the storage device 204 in which a lottery result is to be indicated and multiple kinds of marks represented by data read out from the storage device 204 in a virtual space and writes data representing the association to the storage device 204.

Then, in step S13, the control unit 201 simulates the motion of the virtual object provided with the association in step S12 in the virtual space by physical operation and writes data on the simulation result to the storage device 204.

Then, in step S14, the control unit 201 reads out data representing the association and the data on the simulation result from the storage device 204. The control unit 201 determines a lottery result on the basis of a mark corresponding to a position on the virtual object as determined according to the state of the virtual object in the simulation result. For example, when the virtual object has a die-like polyhedron shape, the control unit 201 determines, as a lottery result, a number represented by dot(s) (mark) displayed on the upper surface of the dice-like polyhedron after the motion is stopped as the result of simulation in step S13.

As in the foregoing, according to the embodiment, a lottery result is not determined only on the basis of a result of simulation of the motion of a virtual object but according to association based on random data between a plurality of positions on the virtual object and a plurality of marks. If a lottery result is determined only on the basis of a result of simulation of the motion of the virtual object, the lottery result could be biased for example depending on the shape of the virtual object or some conditions. In contrast, according to the embodiment, the lottery result is determined according to the association based on random data between the plurality of positions on the virtual object and the plurality of marks and therefore randomness can be secured in the lottery result.

Therefore, according to the embodiment, when a program or device which can carry out lottery drawing is produced, testing comprising an enormous number of actual lottery drawings is not necessary to prove that each lottery result occurs with an intended probability such as an equal probability. It can be proved more easily that the lottery result occurs with an intended probability (occurrence of all the lottery results with the same probability in the above example) by demonstrating that the lottery result is determined according to the association based on random data between the plurality of positions on the virtual object and the plurality of marks.

The present disclosure is not limited to the embodiments described above and can be modified in various forms. More specifically, the embodiments are simply by way of illustrating features, should not be construed as limiting, and various modifications can be made to the embodiment.

LIST OF REFERENCE NUMERALS

100 Game machine
101 Speaker
102 Display device
103 Operation input device
104 Card reader
105 Bill insertion device
106 Ticket dispenser
201 Control unit
202 CPU
203 Memory
204 Storage device
205 Audio sound processing unit
206 Image processing unit
207 Communication unit
208 Peripheral device interface

What is claimed is:

1. An electronic lottery device comprising an electronic control unit including an electronic data processor and an electronic data memory, an electronic data storage unit, a random data generating unit and at least one electronic display, the electronic control unit executes a program stored in the storage unit to thereby implement:
an associating function for randomly associating, based on data from the random data generating unit, a plurality of different marks on a plurality of different positions on a virtual object in which a lottery result is to be indicated;
an operation control function for simulating a motion of the virtual object in a virtual space by physical operation in response to a user input to the electronic lottery device;
a determining function for determining a lottery result on the basis of the mark associated with a particular position on the virtual object as determined according to a state of the virtual object in the simulation result; and
a displaying function for displaying the simulated motion of the virtual object in the virtual space and the lottery result on the electronic display,
wherein the timing of the performance of the associating function is variable and includes at least a timing where the marks associated with the positions of the virtual object are displayed at the moment the user input is received.

2. The lottery device according to claim 1, wherein the virtual object is a polyhedron, and the plurality of positions in which the lottery result is to be indicated are plurality of surfaces of the polyhedron, respectively.

3. The lottery device according to claim 2, wherein the displaying function displays the marks associated on the basis of the random data, on the plurality of surfaces of the polyhedron, respectively.

4. The lottery device according to claim 2, wherein the operation control function simulates the motion of the polyhedron being cast by physical operation in response to at least a direction or a speed based on a user input.

5. The lottery device according to claim 1, wherein the virtual object is a wheel shaped portion for roulette, and the plurality of positions in which the lottery result is to be indicated are a plurality of spots provided at the wheel shaped portion.

6. The lottery device according to claim 5, wherein the displaying function displays each of the marks associated on the basis of the random data, in the vicinity of each of the plurality of spots at the wheel-shaped portion.

7. The lottery device according to claim 5, wherein the operation control function simulates a motion of the wheel-shaped portion spun in response to at least a spinning angle or a speed based on a user input and a motion of a ball moving on the wheel-shaped portion and entering the spot.

8. An electronic lottery device comprising:
an electronic control unit;
an electronic data storage unit from/to which data is read out/written by the control unit; and
an electronic display,
a random data generating unit,
the control unit is programmed to:
randomly associate, based on data from the random data generating unit, a plurality of different marks on a plurality of different positions on a virtual object a virtual object read out from the storage unit and on which a lottery result is to be indicated, and write data representing the association to the storage unit;
simulate a motion of the virtual object in a virtual space by physical operation in response to a user input to the electronic lottery device and, write data on the simulation result to the storage unit;
read out the data representing the association and the data on the simulation result from the storage unit and determine, on the basis of the read out data, a lottery result on the basis of the mark associated with a position on the virtual object as determined according to a state of the virtual object in the simulation result; and
display the simulated motion of the virtual object in the virtual space and the lottery result on the electronic display,
wherein the timing of randomly associating is variable and includes at least a timing where the marks associated with the positions of the virtual object are displayed at the moment the user input is received.

9. An electronic lottery method carried out in an electronic device including an electronic control unit including an electronic data processor and an electronic data memory, and an electronic data storage unit, a random data generating unit and at least one electronic display, the method being carried out by the electronic control unit executing a program stored in the electronic data storage unit, the method comprising:

an associating step of randomly associating, based on data from the random data generating unit, a plurality of different marks on a plurality of different positions on a virtual object on which a lottery result is to be indicated;

an operation controlling step of simulating a motion of the virtual object in a virtual space by physical operation in response to a user input to the electronic device;

a determining step of determining a lottery result on the basis of the mark associated with a particular position on the virtual object as determined according to a state of the virtual object in the simulation result; and displaying the simulated motion of the virtual object in the virtual space and the lottery result on the electronic display, wherein the timing of the performance of the associating step is variable and includes at least a timing where the marks associated with the positions of the virtual object are displayed at the moment the user input is received.

* * * * *